May 3, 1966 V. A. STIFANO, JR 3,248,809
EDUCATIONAL AND AMUSEMENT DEVICE
Filed Aug. 13, 1963 4 Sheets-Sheet 1
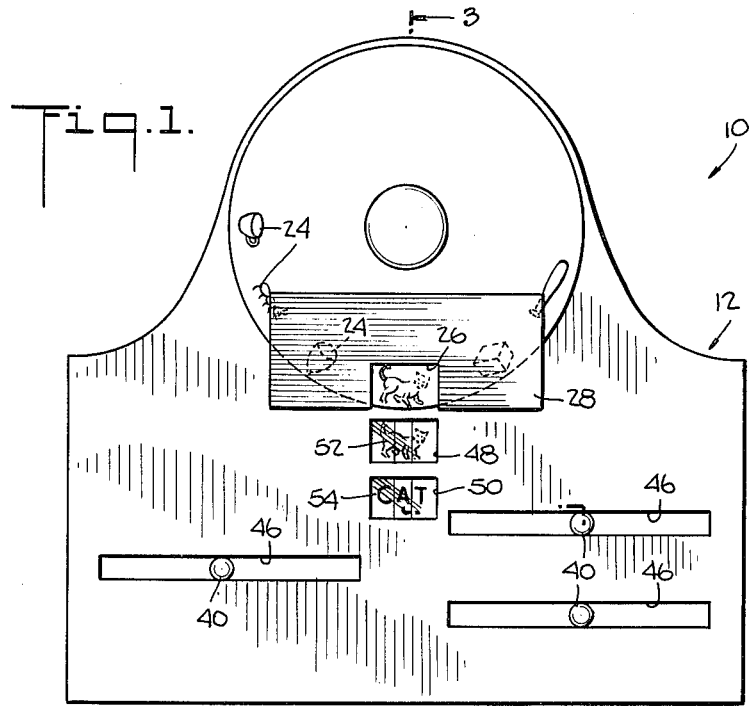
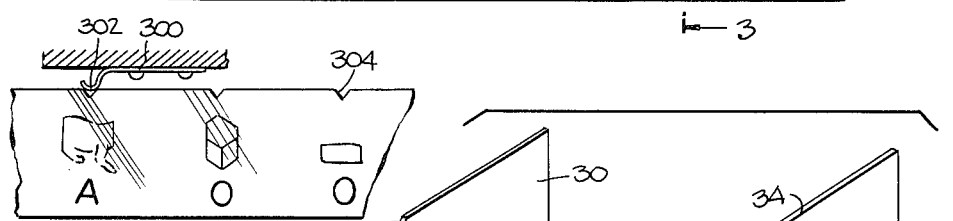
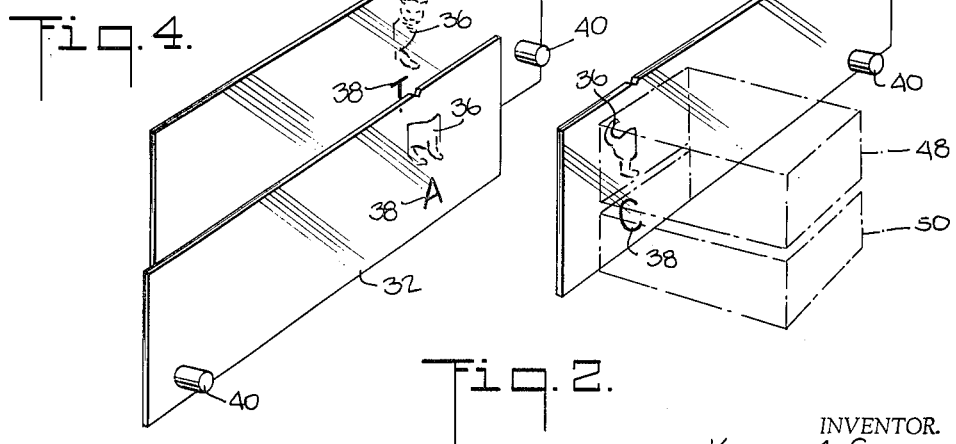
INVENTOR.
VINCENT A. STIFANO, JR.
BY
ATTORNEYS

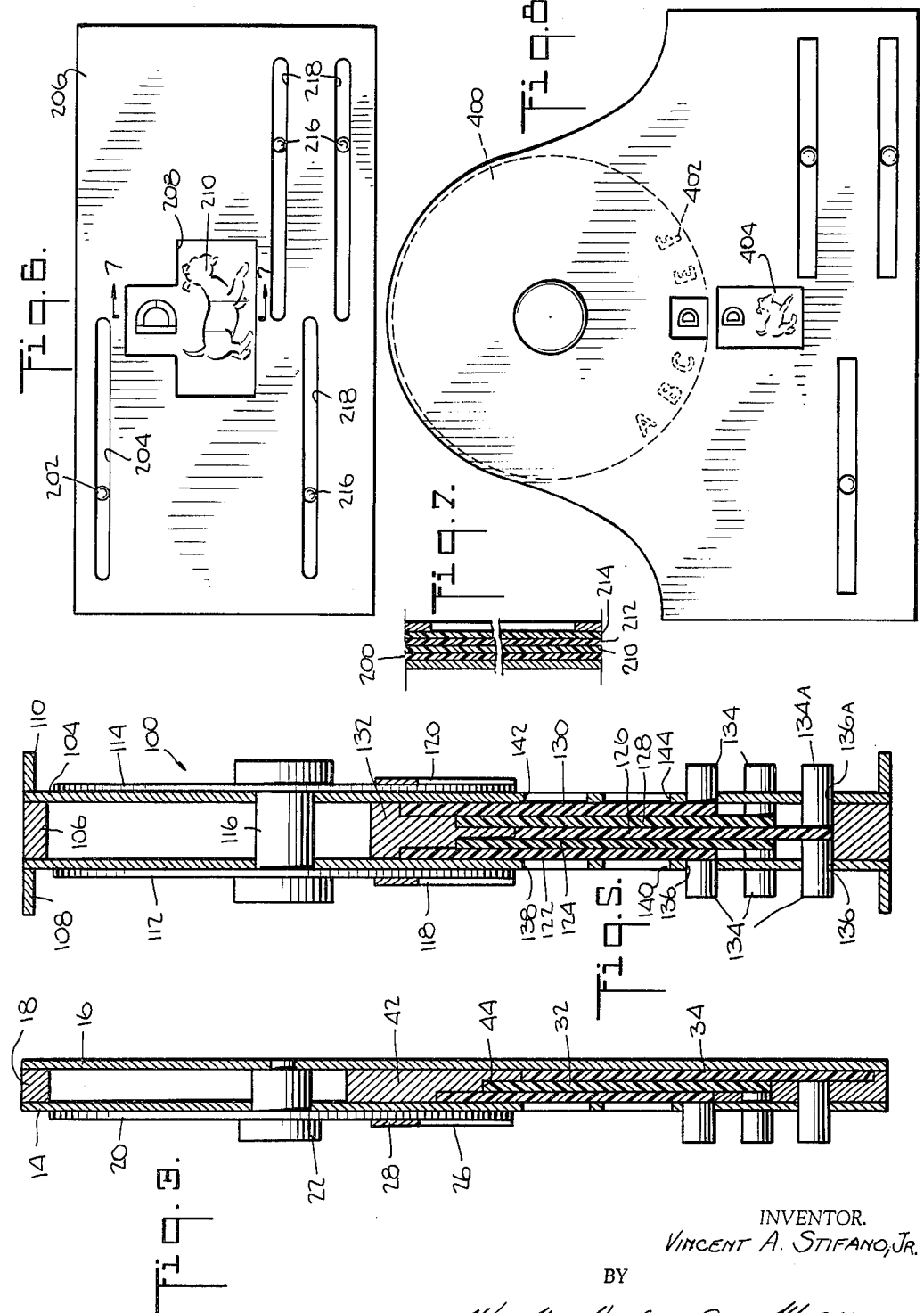

May 3, 1966  V. A. STIFANO, JR  3,248,809
EDUCATIONAL AND AMUSEMENT DEVICE
Filed Aug. 13, 1963  4 Sheets-Sheet 3
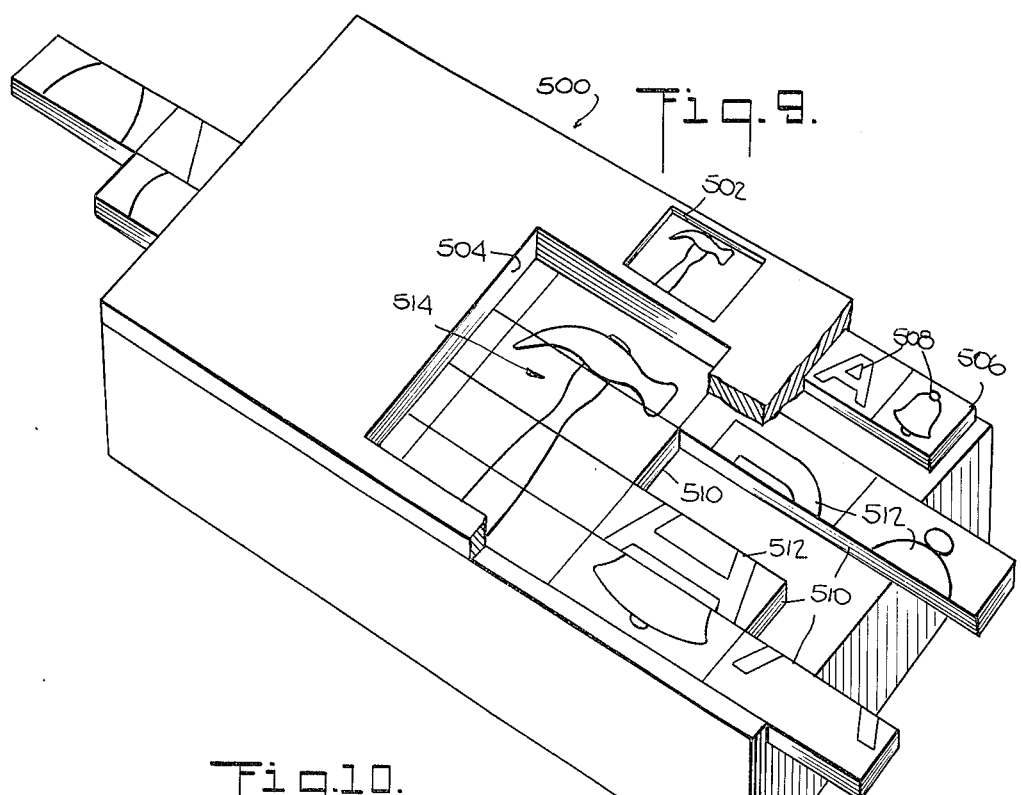
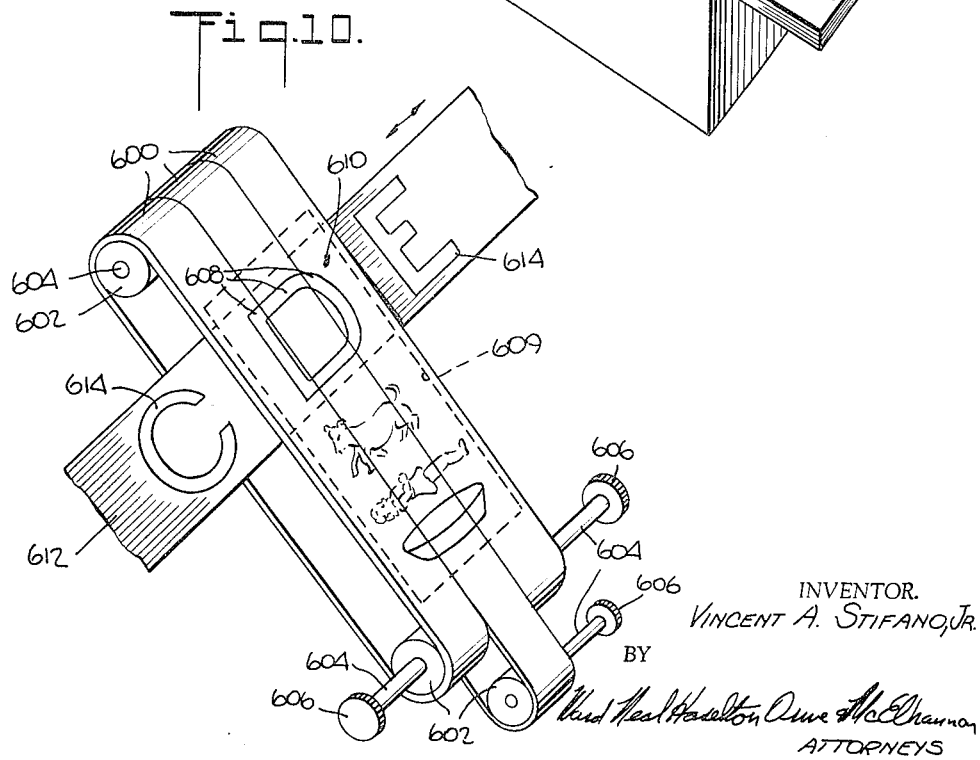
INVENTOR.
VINCENT A. STIFANO, JR.
BY
ATTORNEYS May 3, 1966  V. A. STIFANO, JR  3,248,809
EDUCATIONAL AND AMUSEMENT DEVICE
Filed Aug. 13, 1963  4 Sheets-Sheet 4
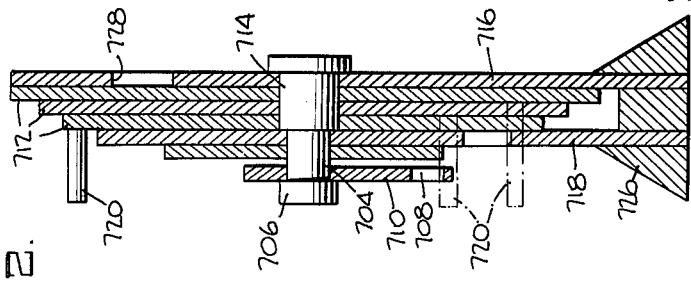
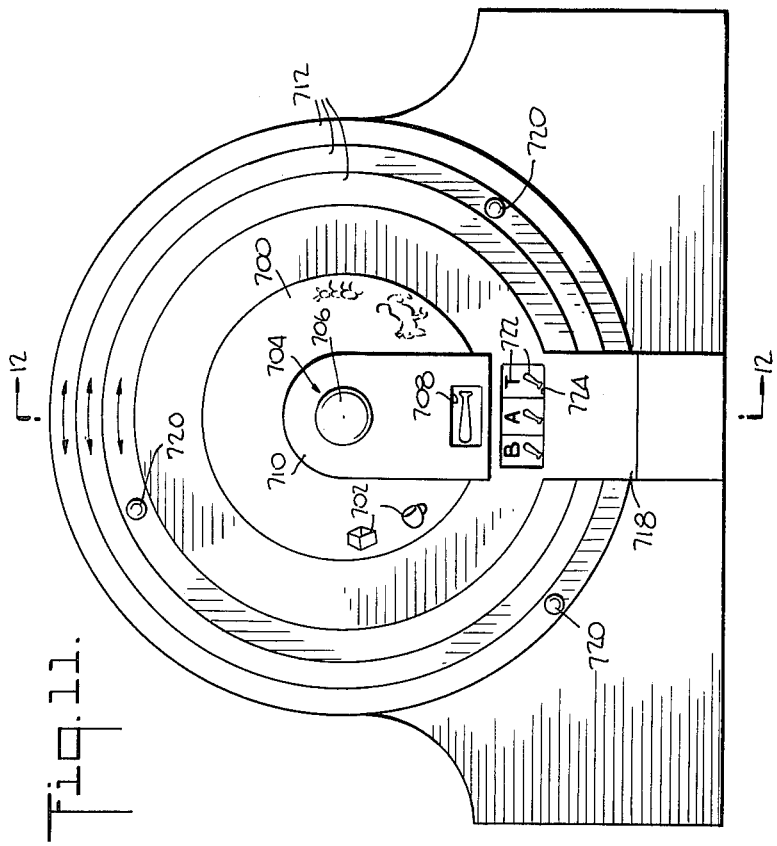
INVENTOR.
VINCENT A. STIFANO, JR.
BY
Ward, Neal Haselton, Orme & McElhannon
ATTORNEYS United States Patent Office 3,248,809
Patented May 3, 1966

3,248,809
EDUCATIONAL AND AMUSEMENT DEVICE
Vincent A. Stifano, Jr., 113 Harding St.,
Wethersfield, Conn.
Filed Aug. 13, 1963, Ser. No. 301,808
11 Claims. (Cl. 35—75)

The present invention relates to educational devices and, more particularly, to a device for reproducing a selected object by means of a plurality of superposed transparent films, each having a portion of the selected object thereon, and preferably including also a letter to enable the user to associate pictures and words or numbers.

There is great emphasis in educational circles today on the use of machines for the self-teaching of students. However, these devices are generally exclusively directed to school age students and usually to the more advanced age groups. The self-teaching devices heretofore available have been too complicated for the younger children to use and were not readily adaptable to teaching this age group.

The device of the present invention is directed to preschool children or those children just learning to read and write. It adapts the self-teaching methods to the problems peculiar to such smaller children. By employing the technique of associating an object familiar to the child with the letter or letters comprising the word for such object, even children of pre-school age can quickly become proficient in spelling. In like manner, basic arithmetic can be taught to such younger children.

The present invention in its simplest form is characterized by the provision of an object selector movably mounted to present a desired object, such as, a picture of a cat, dog, ball, bat, or similar object familiar to the child, to an object station. The child must reproduce such selected object by means of a composite made up of the portions of the selected object on a plurality of films. The films are movable relative to each other beneath a viewing station, and the child manipulates the several film controls until the selected object is duplicated in composite at the viewing station. The films also include thereon the several letters forming the word for the selected object. When the child has duplicated the selected object, the letters on the films spell out the word for the object. Thus, the child associates the word so formed with the familiar object so reconstructed, and rapidly develops the ability to spell.

In like manner, the selected object can be a number of objects, such as, three balls. When the child reconstructs the three balls, there is reproduced the numeral 3. This develops the child's arithmetical ability.

In accordance with one embodiment of the present invention, there is combined in a single reversible structure two teaching aids, one on each side of the device, one of which can be a spelling aid while the other may be an arithmetic aid.

Further objects and advantages of the invention will be obvious herefrom or may be learned by practice with the invention, the same being realized and attained by means of the instrumentalities and combinations pointed out in the appended claims.

The foregoing general description and the following detailed description are exemplary and explanatory, but are not restrictive of the invention.

Of the drawings illustrating by way of example preferred embodiments of the invention and wherein like numerals designate like parts:

FIG. 1 is a front view of a preferred embodiment of the present invention;

FIG. 2 is an exploded perspective view of the superposed relationship of the several transparent films employed in the present invention;

FIG. 3 is a sectional view taken along line 3—3, FIG. 1;

FIG. 4 is a detailed view of the film indexing means;

FIG. 5 is a sectional side elevation of a modified form of the invention;

FIG. 6 is a front view of another embodiment of the present invention;

FIG. 7 is a sectional view taken along line 7—7, FIG. 6;

FIG. 8 is a front view of a fourth embodiment of the present invention;

FIG. 9 is a schematic view of another embodiment of the invention;

FIG. 10 is a schematic view of another embodiment of the invention;

FIG. 11 illustrates another embodiment of the invention;

FIG. 12 is a sectional view taken along line 12—12, FIG. 11.

Turning now to the figures, and particularly FIGS. 1–3, there is disclosed one form of the invention designated generally 10, which comprises a central support 12 including front and rear face members 14 and 16, respectively, maintained in spaced relationship by an intermediate section 18 extending around the periphery of support 12. Members 14, 16 and 18 are preferably of wood, plastic, fiberboard, metal, or like rigid material, and peripheral member 18 may be formed as a single piece or preferably is made up of a composite of several members.

Rotatably supported in central support 12 is an object selector 20, which in this embodiment is preferably circular and centrally supported on stud shaft 22. As shown best in FIG. 1, object selector 20 carries a plurality of object elements 24 spaced around the periphery thereof, and includes such simple objects familiar to a child as a bat, cat, cup, box, book, dog, and the like. Objects 24 may be imprinted, painted or placed on the object selector by means of decalcomanias, or may even be colored photographs. Selector 20 is rotatably mounted on central support 12 to present the selected object 24 at object window 26, formed in shield 28 mounted on face member 14.

With the selected object at viewing window 26, the child now must duplicate the object located thereat. The duplication is accomplished by means of a plurality of transparent films. In the embodiment shown, three transparent films 30, 32 and 34 are employed. However, more or less films may be used without adverse effect. As shown best in FIG. 2, each of the films 30, 32 and 34 has provided thereon a portion 36 of the several objects 24 on object selector 20. In addition to the graphic representations, in this embodiment, each of the films also includes a letter 38 correlated to each of the pictorial sections 36.

Films 30, 32 and 34 are each provided with individual manipulating knobs 40, and are slidably mounted in superposed relationship in central support 12. As shown best in FIG. 3, the lowermost section 42 of peripheral member 18 is provided with a stepped recess 44 for accommodating the slidable passage of the films. In addition, face member 14 is provided with three spaced slots 46, each of which accommodates one of the manipulating knobs 40. The films are mounted in assembled relationship between front and rear face members 14 and 16, with film 32 disposed intermediate films 30 and 34, film 34 being adjacent back member 16 and film 30 being adjacent front member 14. It will be apparent that, if desired, lowermost film 34 may be opaque without adverse effect. To complete the device, front member 14 is provided with two viewing windows or openings 48 and 50, vertically aligned with object window 26.

In operation, after the object selector 20 has been rotated to present the desired object 24 at object window 26, the child suitably slides knobs 40 back and forth in slots 46, appropriately moving the films 30, 32 and 34 to form the composite figure 52 at window 48, which duplicates the object 24 at window 26. Composite figure 52 is made up from the several graphic representations 36 on the films. Simultaneously, the letters corresponding to the graphic representations 36 form in window 48 the composite word 54 for the selected object. Thus, in the illustrated example, the selected object was a cat, which was duplicated in window 48 while the word "cat" appeared at window 50. Therefore, a child, in duplicating the familiar object, learns the spelling of the word for the object.

Turning to FIG. 5, there is illustrated a form of the invention wherein the same device can be employed for teaching two different object lessons. In this arrangements, the central support member 100 comprises front and back members 102 and 104, separated by an intermediate peripheral spacer member 106. In addition, faces 102 and 104 are provided with edge flange members 108 and 110, respectively. In this device, there are two object selectors 112 and 114, rotatably supported in common on a central stud shaft 116, with object selectors 112 and 114 mounted for rotation adjacent faces 102 and 104, respectively, to present the object members thereon beneath their respective viewing windows 118 and 120. To duplicate the objects, there is preferably provided in this embodiment five films 122, 124, 126, 128 and 130, mounted in side-by-side relationship between outer face members 112 and 114, and suitably slidably accommodated in the lowermost section 132 of peripheral member 106. However, more or less films can be employed without adverse effect.

In this arrangement, the innermost film 126 is non-transparent and is provided with graphic representations and/or letters on each face thereof. In a manner similar to the first described embodiment, each of the films is provided with a manipulating knob 134, slidably accommodated in a slot 136 formed in either front face member 102 or rear face member 104, depending on which selector 112 or 114 such film is associated. However, as shown best in FIG. 5, innermost non-transparent film 126 is provided with two knobs 134 and 134a with manipulating knob 134 thereof slidably accommodated in slot 136 in front face member 102, while knob 134a is slidably accommodated in slot 136a in rear face member 104. This is necessary since film 126 is associated with both selectors 112 and 114, having graphic representations on each side thereof.

It will be understood that each object selector 112 and 114 and their respective associated films are operable in like manner to the first described embodiment, so that the objects presented at window 118 are duplicated by the child in window 138 and its corresponding word spelled out in window 140, both of which are formed in front face member 102 from films 122, 124 and 126. In like manner, the objects presented at window 120 are duplicated at window 142 and the corresponding word appears at window 144 formed in rear face member 104 from films 126, 128 and 130.

In operation, the child completes one lesson utilizing selector 112; then he turns the device over and starts the next lesson utilizing selector 114. The dual structure and arrangement permits versatility in the teaching of subject matter to the child. Thus, object selector 112 may be used for teaching a child spelling while object selector 114 may be used to teach the child arithmetic. This provides more diversified subject matter and flexibility in the self-teaching techniques.

Turning to FIG. 6, in the embodiment shown, the object selector comprises an elongated film member 200, having a manipulating knob 202 slidably accommodated in a slot 204 in a support member 206. Film 200 is preferably opaque, but may be transparent with a backing or support 206 being opaque. In this arrangement, film 200 is adapted for sliding movement in housing 206 to present the desired object to a central viewing and object window 208. In this embodiment, the child duplicates the object by means of an overlay arrangement, this method being particularly suited for younger children. To form the overlay, there is preferably provided three transparent films 210, 212 and 214, mounted in contiguous relationship with opaque film 200, and each having an actuating knob 216 slidably accommodated in a slot 218 in housing 206. In operation, the knob 202 is actuated to present the desired object at window 208. Knobs 216 are slidably moved back and forth by the child to form the overlay 210 in window 208 from the corresponding portions of the object representations on the films 210, 212 and 214. This embodiment is particularly adapted for use by the younger child since it merely requires an overlay of the object rather than duplication as in the previous embodiment.

In the embodiment disclosed in FIG. 8, which is similar in construction and operation to the embodiment shown in FIG. 1, the object selector 400 is provided with a plurality of letters 402 of the alphabet. The child duplicates the letter from portions thereof carried on the several transparent films, and simultaneously forms the graphic representation associated with the letter. In this arrangement, it will be noted that, rather than having two viewing windows, a single viewing window 404 may be used with equal facility.

Means are provided to retain the several films in indexed position to prevent inadvertent dislocation thereof as the several films are manipulated. To accomplish this, there is provided for each film a retainer member 300 secured to a central support and having a pawl-like extension 302, which normally seats in an accommodating notch 304 formed in the film at the position on the film aligned with each of the graphic representations thereof. Pawl-like member 302, which is preferably of some spring-like material, seats in notch 304 and retains the film in indexed position until the film is moved by manipulation of its associated knob.

In the embodiment shown in FIG. 9, there is provided a housing 500 having an object window 502 and a viewing window 504 formed therein. The object selector 506 in this embodiment is in strip form with the objects 508 thereon, and is adapted for sliding movement in housing 500 to present the object to object window 502.

The duplication of the object is accomplished by means of a plurality of contiguous strips 510, mounted for sliding movement in edge-to-edge relationship in housing 500. Each strip 510 is provided with a portion 512 of each of the several objects 508, and when suitably manipulated by a child, they form the composite image 514 in viewing window 504, image 514 being formed from the several contiguous portions 512 of the adjacent films 510.

In FIG. 10, there is disclosed alternative means for mounting and manipulating the films to form the composite. In this arrangement, the films 600 are in endless or continuous form, and are mounted in edge-to-edge contiguous relationship with mounting rollers 602, support shafts 604 and activating knob 606 for each film, with at east one roller 602 adapted by sprocket teeth or other means to advance its film 600. Knobs 606 are suitably rotated by a child to present the object portions 608 on the films to the viewing area 609, and thereby form composite images 610 from the adjacent portions 608 on films 600.

In this embodiment, the object selector 612 with its plurality of object elements 614 is mounted for movement through area 609 beneath films 600 and the object element disposed in viewing area 609 is duplicated by an overlay of the corresponding parts on films 600. Likewise, films 600 are preferably provided with additional graphic illustrations 616, which form a desired corresponding picture in area 609 when the child has reproduced the selected object. Thus, as illustrated in FIG. 10, the child has reproduced the letter D, and simultaneously formed in area 609 the picture of a dog, doll and dish, which all begin with the letter D, and this materially aids the child in learning the alphabet.

FIGS. 11 and 12 illustrate yet another embodiment of the invention. In this construction, there is provided an object selector 700, preferably circular in configuration, and having disposed adjacent its periphery a plurality of spaced object illustrations 702. Selector 700 is rotatably mounted on an axial stud shaft 704 having an actuating portion 706 with selector 700 being thus adapted to present a selected object 702 to view at object area 708 in shield 710 on shaft 704.

The duplication of selected object 702 is achieved by means of circular films 712, which are rotatably supported in contiguous relationship on pivot 714, which is an enlarged extension of shaft 704. Pivot 714 is supported at one end in support plate 716 while its other end is carried in guide 718 disposed between selector 700 and the first film 712.

Each film 712 is provided with a suitable actuating knob 720 for advancing the portions 722 of the objects on selector 700 to and from a duplicating zone 724 in guide 718.

If desired, a suitable base 726 may be provided to furnish stability. Likewise, to increase educational and amusement value, plate 716 may also be furnished with a viewing zone 728. In such arrangement, films 712 are formed as laminates with two sets of corresponding object elements thereon, one on each face. The child attempts to spell the word of the selected object by correctly arranging the letters at area 724. To assist, each letter may have an associated graphic representation of the selected object, as shown in FIG. 12. If the letters are properly oriented, spelling the word correctly at area 724, then the picture of a bat is formed correctly in zone 728. If the letters are not properly oriented, the picture in zone 728 is incorrect and the child rearranges the letters in area 724 until the correct picture appears at area 728. This concept can be employed with equal facility with the other embodiments of the invention, such as that shown in FIGS. 3 and 5.

It will be understood that with any of the foregoing embodiments various colors may be employed with the objects on the object selector, color-coded to their corresponding portions on the reproducing films. This is of particular assistance to the younger child and enhances the play as well as the teaching value of the present invention.

It will be understood that other arrangements of the objects and letters may be employed, such as superposing the letter and portion of the object on each film or strip. Further, other convenient configurations and arrangements for the strips or films may be utilized without adverse effect.

Although certain particular embodiments of the invention are herein disclosed for purposes of explanation, further modifications thereof, after study of the specification, will be apparent to those skilled in the art to which the invention pertains. Reference should accordingly be had to the appended claims in determining the scope of the invention.

What is claimed and desired to be secured by Letters Patent is:

1. An educational and amusement device comprising an objective member having a plurality of graphic objective representations thereon, an objective station, means mounting said objective member for selective movement to and away from said objective station to present a selected graphic representation to view at said objective station for duplication by an operator, at least one viewing station, a plurality of films each bearing a complementary portion of each of said graphic representations on said objective member, means mounting said films for movement in superposed relationship through said viewing station, at least all but said lowermost film being formed of transparent material to permit viewing therethrough when disposed in overlying arrangement, and means for selectively moving individual films through said viewing station to present complementary portions of said selected graphic objective representations on said films to said viewing station, whereby said operator from said films at said viewing station forms a composite of said selected graphic objective representations.

2. The device of claim 1 wherein said graphic representations on said objective member are pictorial illustrations and said films each include printed indicia along with the complementary portions of said pictorial illustration thereon, whereby when said operator forms said composite illustration at said viewing station the printed indicia on said films simultaneously forms composite printed matter associated with said illustration.

3. The device of claim 2 wherein said printed indicia are letters which form the word associated with said illustration upon formation of the composite pictorial illustration, and including a second viewing station for viewing the composite word formed when said composite pictorial illustration is formed at said first viewing station.

4. An educational device for the self-teaching of young children comprising an objective member bearing a plurality of individual graphic representations thereon familiar to said young children, an object station, means rotatably mounting said object member for selective movement of said individual graphic representations into and out of view at said object station, at least one viewing station, a plurality of transparent films, each of said films bearing a complementary portion of each of said graphic representations on said object member, means mounting said films for movement in superposed relationship through said viewing station, and means for selectively moving individual films through said viewing station to form a composite at said viewing station of a selected graphic representation at said object station from complementary portions thereof on said films.

5. The device of claim 4 wherein said films are elongated strips mounted for sliding movement through said viewing station.

6. The device of claim 4 wherein said films are circular and mounted for rotation to present their portions of said graphic representations to said viewing area.

7. The device of claim 4 including means for releasably retaining individual films in indexed position as they are moved through said viewing station to form said composite.

8. The device of claim 5 wherein said graphic representations on said object member are pictorial illustrations and said films each include printed indicia along with the complementary portions of said pictorial illustrations thereon whereby when said operator forms said composite illustration at said viewing station, the printed indicia on said films simultaneously forms composite printed matter associated with said illustrations.

9. The device of claim 4 including a second viewing station spaced from the first viewing station and wherein said films include both printed indicia and pictorial illustrations thereon, said printed indicia advancing through said first viewing area and said pictorial illustrations through said second viewing area, whereby upon formation of the correct composite at said first station a corresponding associated composite is simultaneously formed at said second station.

10. A reversible educational device having self-teaching apparatus on both sides thereof to be used in teaching young children comprising a central support, a pair of objective members arranged in back-to-back relationship on each side of said support, and each provided with a plurality of graphic objective representations thereon, at least one viewing location on each side of said support associated with each objective member, means movably mounting said objective member on said support for selective movement of said graphic representations thereon into and out of view at their associated viewing location, a group of transparent films associated with each of said objective members, each film of said groups bearing a complementary portion of each of said graphic representations on said objective member, means mounting said films of each group for relative movement in superposed relationship through its associated viewing location, and means for selectively moving individual films of said groups through their associated viewing locations to form a composite at their respective viewing locations of said selected graphic representation positioned thereat, the back-to-back arrangement of said objective members and associated films providing multiple and complementary teaching facilities for said children.

11. An educational device for the self-teaching of young children comprising an objective member bearing a plurality of individual graphic representations thereon familiar to said young children, a viewing zone, means movably mounting said objective member for selective movement of said individual graphic representations into and out of view at said zone, a plurality of films, each of said films bearing a complementary portion of each of said graphic representations on said objective member, means mounting said films for relative movement through said viewing zone, and means for selectively moving individual films through said viewing zone to form a composite at said viewing zone of a selected graphic representation thereat from complementary portions thereof on said films and wherein said films comprise elongated transparent strips slidably mounted in superposed relationship at least through said viewing zone.

References Cited by the Examiner

UNITED STATES PATENTS

| | | | |
|---|---|---|---|
| 171,507 | 12/1875 | Dennis | 35—71 |
| 1,415,712 | 5/1922 | Rontey et al. | 35—28 X |
| 1,428,456 | 9/1922 | Stranders | 35—71 |
| 2,504,650 | 4/1950 | Chessrown | 35—35 |
| 2,655,738 | 10/1953 | Shapiro et al. | 35—74 X |
| 2,974,426 | 3/1961 | McDonald | 35—26 |

FOREIGN PATENTS 712,342   7/1954   Great Britain.

EUGENE R. CAPOZIO, *Primary Examiner.*

JEROME SCHNALL, *Examiner.*

HARLAND S. SKOGQUIST, *Assistant Examiner.*